US012714128B2

(12) United States Patent
Dass et al.

(10) Patent No.: US 12,714,128 B2
(45) Date of Patent: Aug. 25, 2026

(54) CURRY ASSISTED PRESSURE STERILIZATION (CAPS) METHODS FOR FOOD PRODUCTS

(71) Applicants: Priya Ranjan Dass, Ann Arbor, MI (US); Navnita Dass, Ann Arbor, MI (US)

(72) Inventors: Priya Ranjan Dass, Ann Arbor, MI (US); Navnita Dass, Ann Arbor, MI (US)

( * ) Notice: Subject to any disclaimer, the term of this patent is extended or adjusted under 35 U.S.C. 154(b) by 0 days.

(21) Appl. No.: 15/271,340

(22) Filed: Sep. 21, 2016

(65) Prior Publication Data

US 2018/0317532 A1 Nov. 8, 2018

(51) Int. Cl.

| | |
|---|---|
| ***A23L 23/00*** | (2016.01) |
| ***A23B 2/10*** | (2025.01) |
| ***A23B 2/80*** | (2025.01) |
| ***A23L 27/10*** | (2016.01) |
| ***B65B 25/00*** | (2006.01) |

(52) U.S. Cl.

CPC .............. *A23L 23/00* (2016.08); *A23B 2/103* (2025.01); *A23B 2/80* (2025.01); *A23L 27/105* (2016.08); *B65B 25/001* (2013.01); *A23V 2002/00* (2013.01); *A23V 2250/2112* (2013.01); *A23V 2250/212* (2013.01)

(58) Field of Classification Search

CPC ......... A23V 2002/00; A23L 3/00; A23L 3/30; A23L 3/32; A23L 23/00; A23L 27/10; A23L 5/00; A23L 3/0155; A23L 5/30; A23L 19/00; A23L 3/26; A23B 2/80; A23B 2/103; B65B 25/001

USPC ........... 426/231, 106, 521, 392; 99/485, 517

See application file for complete search history.

(56) References Cited

U.S. PATENT DOCUMENTS 6,086,936 A * 7/2000 Wilson ................ A23B 4/0056 426/521
6,207,215 B1 3/2001 Wilson
6,635,223 B2 * 10/2003 Maerz .................. A61L 2/0011 422/1
2008/0311259 A1 12/2008 Singh

OTHER PUBLICATIONS

Yang, Xiao, "New (to me) at Costco—Maya Kaimal Tikka Masala sauce", Jan. 31, 2008, retrieved online Sep. 25, 2018 (Year: 2008).*
Piano, John and Lisa Messinger, The Tofu Book: the New American cuisine, 1991, pp. 36. retrieved online Sep. 25, 2018 (Year: 1991).*
Zhang, Howard Q., Gustavo V. Barbosa-Canovas, V.M. Balasubramaniam, C. Patrick Dunne, Daniel F. Farkas, and James T.C. Yuan, Nonthermal Processing Technologies for Food, Wiley-Blackwell, IFT Press, 2011, pp. 46. (Year: 2011).*
Dimblebly, Henry and Jane Baxter, The Guardian: The Secret to Making Great Curry pp. 1-5 (Year: 2014).*
Raghavan, Susheela, Handbook of Spicies, Seasonings and Flavorings, 2nd edition, CRC Press, Table 26.7 (Year: 2006).*
Why Does Curry Flavor Improve Overnight https://cooking.stackexchange.com/questions/32460/why-does-curry-flavor-improve-overnight-beyond-the-effects-of-permeation-and-in?answertab=active#tab-top (Year: 2013).*
Higgins, Kevin T. Pasteurization Without Heat, https://www.foodprocessing.com/on-the-plant-floor/plant-operations-and-engineering/article/11328783/pasteurization-without-the-heat, Jul. 9, 2014. pp. 1-4 (Year: 2014).*

* cited by examiner

*Primary Examiner* — Hong T Yoo
(74) *Attorney, Agent, or Firm* — Cygnet IP Law, P.A.; Stephen W. Aycock, II

(57) ABSTRACT

The present invention is the first method for the pressure sterilization of low acid food items (pH≥4.6). The HPP (high pressure pasteurization) which uses very high pressure of 80000 psi to 90000 psi for 1 to 5 minutes on the food products is very effective in killing almost all pathogens but fails to inactivate the bacterial spores. Hence all HPP treated food items now in the US grocery stores like Salsa, Hummus, or Fruit Juices etc have 60 to 90 days of shelf-life in the Fresh or Deli section (40° F.). Our invention of CAPS (Curry Assisted Pressure Sterilization) uses the spices mainly Turmeric in Indian food to trigger the germination of superdormant spores during the HPP which in turn gets inactivated by very high pressure. Our CAPS treated Curry sauces have the shelf-life of 500 days in the refrigeration (40° F.) and 30 days at ambient temperature (70° F.).

11 Claims, 2 Drawing Sheets

CURRY ASSISTED PRESSURE STERILIZATION (CAPS) METHODS FOR FOOD PRODUCTS

BACKGROUND

During my MBA course-work at Ross School of Business, University of Michigan, Ann Arbor, MI, I worked at Domino's Pizza HQ in Ann Arbor for a project. I always marveled at Domino's journey from a small pizzeria in a small town to a global food chain, with one store right there in our neighborhood at Kolkata, India. So, I was kind of bothered with a question: why is there no Indian food chain similar to Chinese Panda Express or Mexican Chipotle or Italian Olive Garden? Incidentally, when we started in 2009 with the express purpose of making an Indian food chain, our cafe in Ypsilanti, MI is just 3 blocks away from the first Domino's store. So at least the history has our back. By 2011, we opened our first franchise location with the same menu in Columbus, OH, 3 hours drive from Ypsilanti, MI. Then our struggle started. In 2011, I don't think there were 2 Indian restaurants with the same menu in the US though there are approximately 3500 Indian restaurants altogether. Normally the Indian restaurant owners may own 4-5 restaurants in and around a town but they use different locations to cover such diverse Indian cuisine. The reason is as saying goes, in India, the language and the food change every 100 miles. For example, the Indian constitution lists 22 official languages. By 2015, I did come across an Indian food franchise concept in California.

To maintain the same standard at our Columbus, OH location, we decided to deliver the base sauces of onion and tomato from the Ypsilanti, MI location. A few Indian restaurants like us make the base sauces and use these sauces to make entrees as per the patrons' order. Entrees are basically currycurry based. So when you order say Chicken Tikka Masala, the chef would mix the onion and tomato base sauce, add dairy cream, mix cooked or grilled chicken and sauté the combination with some other spices to make the entree. A majority of Indian restaurants won't bother to make the base sauces. They would straightway use some onion paste, mix with tomato sauce from can, mix spices and do other things as described above to make the same entree. Like this is how we Indians cook at home. The challenge was to send the base sauces in the cooler which is good enough for manufacturing plus 7 days. That did not work. Then we tried sending the frozen base sauces. That could have stayed good for 30 days or more. But when we used the frozen base sauces after 20 days to make the entrees as explained earlier, it tasted so different. After 6 months, we closed down the Columbus location. It was meant to be a franchise location, besides maintaining the same taste and flavor of food, there was no point in having a full-fledged operation of an Indian restaurant with a head chef and other assistants in the kitchen. That model was simply not viable.

The Columbus setback pushed me on the path of finding a longer shelf-life process for the base sauces or ideally curry. For example, please see attached our menu, which I devised in anticipation of finding some solutions for curry shelf-life. You won't find such a menu anywhere in which patrons can mix and match to create 700+ entrees.

June 2015 was the turning point for me when the news of sale of Garden Fresh Salsa to the Campbell Soup Co. was well publicized in Michigan. A Detroit based food vendor, Mr. Jack Aronson, struck the biggest deal ever for the Michigan food scene when he sold his company for $231 million. And his product line 'Garden Fresh Salsa' was the No. 1 brand in the U.S. and his 'Hummus' line was No 3 in the U.S. Why? His was the first 'Fresh' salsa and hummus in the refrigerated section of the grocery stores in the US. High Pressure Pasteurization (HPP) gave them the shelf-life of 75-80 days without using any preservatives. This is the first time I heard about HPP. But the big question was—is currycurry fit for HPP? HPP typically includes applying 85000 psi pressure for 3 minutes and what happens to taste and flavor is anybody's guess. HPP had been done on salsa, hummus, juices, etc. which do not use spices like we do in Indian cooking.

When I first met Jack on 5 May 2016, he was pretty impressed with my concept of 'Disruptive Eating' and how Indian food can play a role in fighting the obesity in Michigan and beyond. Luckily for me, he was familiar with Indian food and he instantly recognized our samples are so different from the food of other Indian restaurants which he had tried before. Come 11 May 2016, when Ms. Maggie Cook, Assistant to Jack and an entrepreneur in her own right texted me in the morning of 11th May to come and pick up HPPed curry samples, perhaps the first in the world. So the curry had withstood the HPP pressure. Then we, I, my wife and our Chef, tasted these samples in cold and making some entrees, no change at all in flavor or texture. So the next waiting game began for the shelf-life. We were keeping fingers crossed.

As is the precedence for other HPPed foods, we asked the BRS Lab in Michigan to test HPPed curry for 75 days shelf-life in the cooler. In the back of my head, there was 'double mega thermal pasteurization' (our 2-step cooking process disclosed herein) referenced earlier. So, I kept some samples for the internal testing. By the end of July 2016, 75th day lab reports were in with complete Organoleptic test which found the taste, texture, color, smell all acceptable. On 11 Sep. 2016, at 120th day mark, we found the HPPed curry samples as good as day one in our internal testing. Our internal testing involved to taste the curry in cold as well as to make the entree from those samples. That is how the patrons are supposed to use our curry—cold as a sauce, dip, spread or dressing or to make entree by heating it to 212 F. At this point, we decided to file for a US patent on 21 Sep. 2016 for using HPP to get the shelf-life of 100 days or more. But we did not have the lab report for the 100th day to back up our claim yet. More the shelf-life for our HPPed curry, more the impact of our invention as we are aiming to change the health profile of the US and beyond.

So the next step for me was solving the problem of how to maximize the shelf-life for curry once we knew now it is good for more than 100 days. Mr. Aronson had used the same PET containers for our curry as he had used for his salsa, hummus etc. That is true that ours is the first cold filled packaged Indian food and it was to be HPPed, PET containers were the natural choice for much better impact strength. But the fact of the matter is Indian food is served steaming hot in the restaurants all over the world and hence so when the patrons order take-out or carry the leftovers home, the natural tendency is to 'microwave' the food for reheating. For real flavor of the spices, Indian food needs to be heated say up to 160-180 F. So, many Indian restaurants use PP containers (recycle code 5) which are 'Microwavable.' In contrast, PET containers are not microwavable and a bit costlier. But we made that compromise for the sake of longer shelf-life in 2016.

turmeric is the soul of Indian food and I am not sure why it is not used to such an extent in other cuisine as per my knowledge. I have never seen turmeric as a product or spice at Sam's club or GFS though you can find most of the spices there now-a-days. But yes I have found 'Curcumin' tablets at WalGreen, Curcumin being the main component of turmeric. Curcumin has been used to treat all types of health issues from heart disease to cancer to Alzheimer's disease to weight loss. Some people use 'turmeric extract' for the natural yellow food color for baking items, we do too. Is its distinct yellowish color the biggest impediment to its usage, not sure? Besides turmericturmeric, Indian food's main ingredients are onion, tomato, garlic, ginger, cumin, coriander, cloves, cinnamon. All of them have anti-microbial properties and turmeric is the king. Actually, turmeric pushed us to modify our cooking process. My co-inventor and wife, Navnita Dass, suggested that we modify our process to permit turmeric and other spices to interact with the sauce for a longer period in larger containers in a separate cooler. Incidentally, we have two walk-in coolers, one is used for restaurant purposes. So, there is little human interaction or chance of any contamination in the other cooler designated for the packaged curry production. That is how our 2-day cooking process with the overnight cooling was invented. The other option was to fill PET containers and seal them as soon as the final curry is cooled to 40 F—from 135 F to 70 F in 2 hours and then 70 F to 40 F in 4 hours. That could have minimized the interaction of oxygen with the curry as very little air is left inside after the sealing. But it minimizes the surface area of interaction between the spices and curry too.

For the next lab test by Certified Laboratories in Chicago (official lab for APC, Milwaukee), we provided them both pre-HPP and post-HPP samples of two curries—Mothers' Curry (vegan, onion based) and Tikka Masala Curry (vegetarian, with dairy, tomato & onion based). 90% of Indian curry flavors use some variant of these two curries. The very first result vindicated us in the sense that our pre-HPP samples have <10 microbes which is less than detectable levels. And the rest is history as we now have 500$^{th}$ day shelf-life report almost similar to 1$^{st}$ week report. So, it's hard to say when HPPed curry would go bad. You may agree with our nomenclature of 'Super Pasteurization' of our curry which I used in my 21 Nov. 2016 letter to rephrase our invention. A food item with 6 months shelf-life in the refrigeration without any preservatives or food additives is unheard of and here we are talking about 500 days.

Though we may find later what out of 5 components played how much role in achieving such long shelf-life~

1. our unique 2-step cooking process
2. Ingredients including Spices used

The first two brings the microbes level to <10

3. HPP in its new avatar of not exactly killing pathogens, but disabling them for life
4. PET containers with 50 times less OTR than PP containers, (e.g., to-go food containers)
5. Refrigeration The last 2 steps help minimize oxygen interaction with food.

BRIEF SUMMARY OF THE INVENTION

This could be the one of the most significant inventions of the 21st century if it is measured by its potential impact on the self, the community and the planet. During our transformation starting in August 2013 from a fine dining Indian restaurant with full bar with satellite locations at 12 places to a self-service Indian cafe, being the first soda free and only serving Whole wheat breads cafe in Michigan or the US (www.curryFresh.US) we became the mission-first food vendor with the mission to fight the obesity and overweight prevalence here in the U.S. One thing was clear to me. Indian food is consumed by only 5% of the US populace and for a semblance of an Indian food chain, we need 25% of populace eating Indian food. Not an easy task by any standard given that we are talking about changing the eating habits of the people. But yes, we give each person to choose a purpose to eat Indian food from so many which our concept of 'Disruptive Eating' creates. Eating may seem most mundane act of our daily life but its impact is far reaching. I explain that in our blog at http://NirmalAsRamban.blogspot.com.

Benefits of Such Long Shelf-Life for HPPed Curry:

1. HPPed curry makes Indian food more affordable and accessible which is at the front, center and back of DisruptiveEating.com, please see the details at our website. How?
   - A. As of today, Indian food you can buy at an Indian restaurant which is few and far between if you think of a total 3500 Indian restaurants all across the US, with half of them in NY-NJ corridor and California. Besides that, the restaurant food is good for only 7 days in the refrigeration. Some packaged Indian food include preservatives or are in the frozen section. Both preservatives and freezing distort the real flavors of the spices.
   - B. Our HPPed Indian food solves both problems—its good for 90 days and it keeps intact the original flavor.
   - C. For retail we are date-stamping for 90 days to keep parity with other 'Fresh' items. our HPPed products do not go waste as even after 90 days, we can use these curry at Indian restaurants and other cafeterias.
   - D. Hence we can offer 100% buy-back to grocery stores and that enables to sell these products at all types of stores from Dollar General to Gas stations to 7/11s to Krogers to Whole Foods.
   - E. Also we can have an 8 oz curry priced at $3, a first in the US market. So, your gourmet journey starts at $3, which can make a lunch or dinner for $5.
   - F. We have started our launch with curry only which is basically Indian spices in 'ready to use' form which can make your salad, bowl of pasta or barbecue instantly flavor. People have lot of myths about Indian food being spicy, oily, or creamy, so it's better to start with the usage as dip, dressings, pasta sauce before graduating to making an entree of your choice. Later we plan to launch 'ready to eat' entrees and full meals.
2. HPPed curry and CAPS can transform the restaurant industry in general.

Chefs at an Indian restaurant spend 40% of their time making the base sauces and the curry what I have seen the first hand since 2009. It is such a lose-lose situation when they make sauces twice a week to see it go waste if demands are less or go for urgent production if there is suddenly high demand due to some catering events or functions. HPPed curry can solve this problem altogether and change the operational model of an Indian restaurant resulting in huge savings. This could make Indian food more affordable which is considered elite now.

Similarly CAPS could be used to extend the shelf-life of pizza sauce and the stocks used in American restaurant which has potential to transform the operations of other restaurants as well as reducing huge waste.

3. The biggest impact of HPPed curry could be on global food waste

Think of a country like India, which wastes 4 billion pound of tomato and 2 billion pound of Onion every year, accounting for 22% of total produce. Why? Because India does not have enough cold storage facility or even after processing how much ketchups or onion paste with preservatives you expect people to eat. Onion, tomato and spices are main ingredients of curry. Now assume if we can convert even half of the wasted onion and tomato in curry (Value added products) and HPPed them, it stays good for 500 days in refrigeration now. But the big deal is we can export curry to all across the globe due to such long self-life and because it could be used for lunch or dinner.

Since time immemorial people travelled to India for its spices and we are bring the same in 'ready to use' sauce form. No need to worry about how much water to add or how long to cook. This saving of wastage could be a boon for the farmers and for the general economy of developing countries.

CAPS could be used to transform any wasted vegetables or grains into a food with long shelf-life even in Michigan or elsewhere.

US alone wastes $165 Billion of food, 60% by businesses like grocers and restaurants, and 40% by consumers. Total global food waste is said to be one trillion dollars annually. CAPS and HPP in general can help reduce this greatly to make the fight against global hunger and poverty more effective.

Conclusion

Obesity is a global menace. Let me share link on the global obesity below, also see attachments to this application.

http://www.cnn.com/2016/04/01/health/global-obesity-study/index.html

What chance does the United States have to stop the rise of obesity by 2025? Zero, the study says.

I can corroborate this from my own experience. People are dying 18 years earlier due to obesity. Obesity also affects quality of life and impacts work through lost work hours, hours spent receiving health care or lost school hours of kids. Still people think this is the problem for others, not us. Eating medicines to stay healthy is the new normal, US consumes 52% of world medicines with 5% of world populace.

We believe that the health equality is the key to fight the income and educational inequality—3 components of the social inequality so rampant and visible now-a-days in the US and all across the globe.

Our products have the potential to make the U.S. and beyond more equitable.

DETAILED DESCRIPTION

Figure 1A:
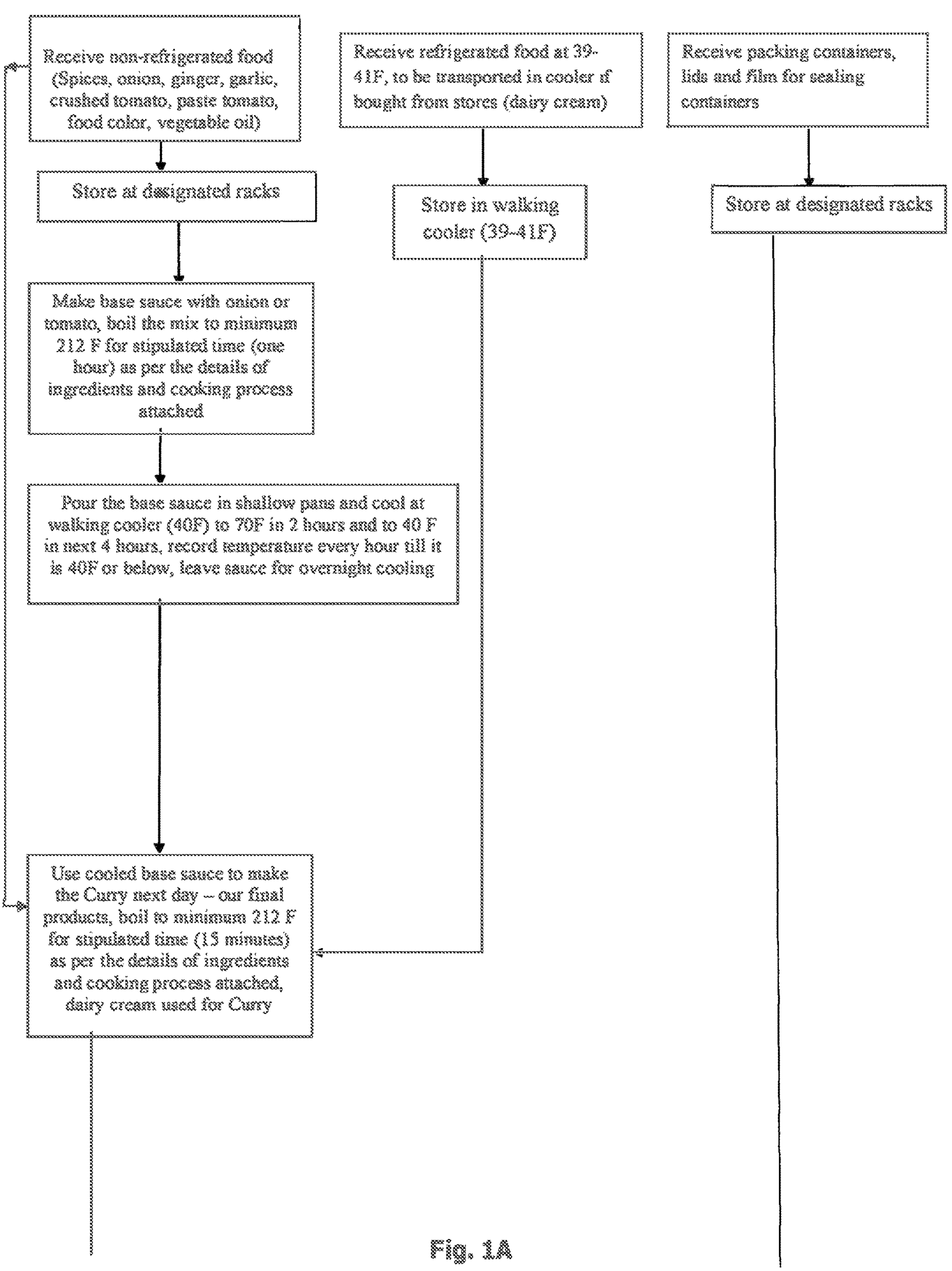
FIGS. 1A and 1B show a flowchart depicting a process for preparing, cooling, packaging, high-pressure-processing, and distributing shelf-stable refrigerated food products in accordance with some implementations of the disclosed subject matter.
Figure 1B:
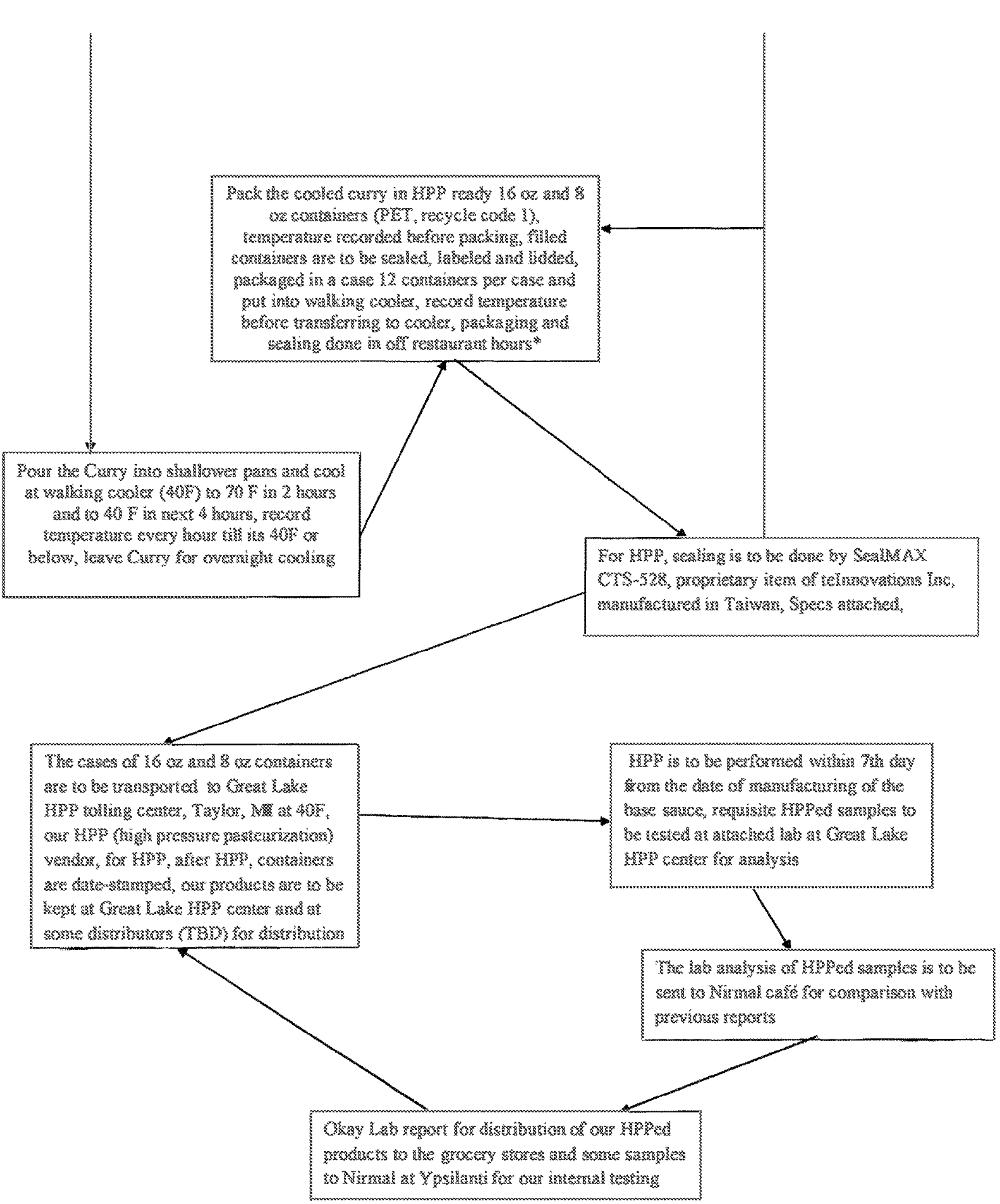

Some implementations of the present disclosure generally relate to the use of disruptive technology (high pressure pasteurization) to bring the restaurant quality Indian food to nearby grocers or to a consumer's doorstep (e.g., via Amazon.com, we are already approved to sell at their platform and online ordering at www.curryFresh.net), Indian food being the key to our mission of fighting the obesity and overweight prevalence here as explained at www.DisruptiveEating.com, see attached print-outs of our website. The present shelf-life of 500 days for HPPed curry has huge potential to reduce the global food waste and change the food industry in general.

1. The food products or items mentioned in claims 1, 2, 3 can include Mother's curry (onion based) and Tikka Masala curry (tomato based). There curries can be used to make entrees at an Indian restaurant. So, if you order Chicken Tikka Masala or Tofu Tikka Masala at 'Nirmal' cafe in Ypsilanti, MI, our chefs would pour 'Tikka Masala' curry into a pan, mix grilled chicken or fried tofu into the sauce and boil it for 5-10 minutes max to get your entrees ready.
2. Both food items mentioned in claim 4 are low acid with pH >4.7 as per stipulation of FDA below though it is meant for shelf-stable food items at ambient temperatures.

A low-acid canned food (LACF) is any food (other than alcoholic beverages) with a finished equilibrium pH greater than 4.6 and a water activity greater than 0.85, excluding tomatoes and tomato products having a finished equilibrium pH less than 4.7. An acidified food (AF) is a low-acid food to which acid(s) or acid food(s) are added and which has a finished equilibrium pH of 4.6 or below and a water activity (aw) greater than 0.85.

The pH of pre-HPP Mother's curry and pre-HPP Tikka Masala curry varies from 4.9 to 5.2. Post-HPP pH of our products varies from 4.5 to 5.5 over 500 days testing as per our lab reports.

3. The method of making Mother's curry and Tikka Masala curry includes a unique 2-step process (appendix 1). Spices such as turmeric, cumin, coriander, ginger, garlic, clove do play a great role in killing of spores and spores forming bacteria.

HPP used in CAPS uses cold water (40-50 F) at high pressure of around 85000 psi for 3 minutes to kill bacteria and other microorganisms.

4. Our lab reports (appendix 2) show that CAPS does kill spores and spores producing bacteria. Please see attached 'Eureka' write-up by me and an article "Response of Spores to High Pressure Processing" by the researchers from University of Delaware and others.
5. We did have testing of our products at ambient temperature for 30 days and we found it satisfactory. It opens huge possibility of our HPPed products being the first such products shelf-stable at ambient temperature. As of now HPPed products are shelf-stable in the refrigeration. More lab test results are awaited.
6. HPP does solve the taste distortion problem of packaged Indian food now in grocery stores either shelf-stable with preservatives at ambient temperatures or in the frozen section. The spices used in Indian cooking don't gel well with preservatives or are not designed to tolerate sub-zero temperature for long.
7. Curry is the heart or soul of Indian cuisine. It is liquid or semi-liquid depending on the composition. It is used to make an entree. Let me explain. If you come to our Curry Fresh cafe and order say Tofu Tikka Masala or Chicken Tikka Masala, both entrees. Our chef would pour 'Tikka Masala' curry into a pan, mix tofu or grilled chicken into it and boil it for 5 minutes. Your entree is ready. Please see attached our menu at Nirmal cafe. Other Indian restaurants do it differently. We Indians typically eat entrees with the rice or breads. The entrees in Indian cuisine are always served hot (say 160-200 F) for the real flavor of spices. Though curry at cold temperature (say 50-100 F) could be used as pasta sauce, barbeque sauce or dressing, dip or spread.

8. As mentioned herein, PET containers have good impact strength (needed for HPP), 50 times less OTR (Oxygen transmission rate), important for extended shelf-life and very low MVTR (Moisture vapor transmission rate), important for curry with almost 99% moisture content. See attached for link print-out-http://www.alphaplastic.com/bottle-basics/plastics-comparison-chart.php for the comparison chart of various plastics. PET containers beat all types in our requirements. One drawback of PET containers is that they are not 'Microwavable'.

We claim:

1. A method for Curry Assisted Pressure Sterilization (CAPS) pasteurization, the method consisting essentially of:

in a first cooking stage, cooking a base curry sauce a first time, wherein the base curry sauce includes one of an onion sauce or a tomato sauce;

cooling the base curry sauce in a first cooling stage;

in a second cooking stage, cooking the cooled base curry sauce again;

cooling the base curry sauce in a second cooling stage to create a final base curry sauce;

maintaining the final base curry sauce at 40 F.;

placing the final base curry sauce into a container;

sealing the container; and performing a high-pressure pasteurization (HPP) process on the container, wherein, during the HPP process, the final base curry sauce is subjected to a high pressure applied by water from a water tank, and the container temperature is maintained at 40 F.-50 F.

2. The method of claim 1, wherein the base curry sauce includes a mix of the onion or tomato sauce with one or more of turmeric, cumin, coriander, garlic, ginger, clove, and fenugreek leaves.

3. The method of claim 1, wherein the first cooking stage includes at least one hour of cooking at 212 F. and adding one or more spices.

4. The method of claim 1, wherein a pH of the base curry sauce prior to the high-pressure pasteurization (HPP) is from 4.9-5.2.

5. The method of claim 1, wherein the container includes one of a round PET container or a pouch; and the method further includes putting a lid on the container after the sealing.

6. The method of claim 1, wherein the final base curry sauce has a shelf-life of at least 150 days in refrigeration.

7. The method of claim 1, wherein the base curry sauce does not include any preservatives as food additives while maintaining a refrigerated shelf-life of at least 100 days.

8. The method of claim 1, wherein the high-pressure pasteurization includes bringing the container to a pressure of between 85000-86000 psi.

9. The method of claim 1, wherein, during the high-pressure pasteurization, the container is subjected to pressure for 3 minutes.

10. The method of claim 1, wherein the HPP treated final base curry sauce has a shelf-life of 30 days at ambient temperature.

11. The method of claim 1, wherein the final base curry sauce has a pH of 4.5 to 5.5.

* * * * *